US012759421B2

(12) United States Patent
Zhong et al.

(10) Patent No.: US 12,759,421 B2
(45) Date of Patent: Oct. 13, 2026

(54) METHOD, MODEL, DEVICE AND STORAGE MEDIUM FOR CONTROLLING AN ENERGY STORAGE SYSTEM FOR RAIL TRANSIT

(71) Applicant: BEIJING JIAOTONG UNIVERSITY, Beijing (CN)

(72) Inventors: Zhihong Zhong, Beijing (CN); Zhongping Yang, Beijing (CN); Fei Lin, Beijing (CN); Hu Sun, Beijing (CN); Xiaochun Fang, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 377 days.

(21) Appl. No.: 18/477,119

(22) Filed: Sep. 28, 2023

(65) Prior Publication Data

US 2024/0140241 A1 May 2, 2024

(30) Foreign Application Priority Data

Oct. 27, 2022 (CN) ......................... 202211330885.2

(51) Int. Cl.
*B60L 53/62* (2019.01)
*B60L 53/63* (2019.01)
(Continued)

(52) U.S. Cl.
CPC ............... *B60L 53/62* (2019.02); *B60L 53/63* (2019.02); *B60M 3/02* (2013.01); *B60M 3/06* (2013.01);
(Continued)

(58) Field of Classification Search
CPC .. B60L 2200/26; B60L 2260/46; B60L 53/62; B60L 53/63; B60L 58/12; B60M 3/02; B60M 3/06
See application file for complete search history.

(56) References Cited

U.S. PATENT DOCUMENTS 9,679,258 B2 * 6/2017 Mnih ...................... A63F 13/67
9,899,856 B2 * 2/2018 Lee .......................... H02J 7/34
(Continued)

FOREIGN PATENT DOCUMENTS

CN 105226790 A * 1/2016
CN 107368004 A 11/2017
(Continued)

OTHER PUBLICATIONS

First Office Action dated Jun. 17, 2026 of corresponding CN patent application No. 202211330885.2 (8 pages).
(Continued)

*Primary Examiner* — Jason C Smith
(74) *Attorney, Agent, or Firm* — Millen, White, Zelano & Branigan, P.C.; Christopher W. Brody

(57) ABSTRACT

The present application discloses a method and a model for controlling an energy storage system for rail transit, a device, and a storage medium. The method includes: determining an offline charging-discharging action according to a state of an energy storage system based on an offline algorithm; determining an online charging-discharging action according to the state of the energy storage system based on a deep reinforcement learning algorithm; acquiring a fusion ratio of the offline charging-discharging action to the online charging-discharging action according to a communication delay amount and a delay degree; and fusing the offline charging-discharging action and the online charging-discharging action according to the fusion ratio and outputting a fusion result to the energy storage system.

9 Claims, 14 Drawing Sheets

(51) Int. Cl.
*B60M 3/02* (2006.01)
*B60M 3/06* (2006.01)

(52) U.S. Cl.
CPC ....... *B60L 2200/26* (2013.01); *B60L 2260/46* (2013.01)

(56) References Cited

U.S. PATENT DOCUMENTS

| | | | | |
|---|---|---|---|---|
| 10,090,683 | B2 * | 10/2018 | Canadi | H02J 7/52 |
| 2004/0232883 | A1 * | 11/2004 | Ochiai | B60L 58/10 320/125 |
| 2013/0141051 | A1 * | 6/2013 | Kang | H02J 3/32 320/134 |
| 2017/0054784 | A1 | 2/2017 | Panattu et al. | |
| 2018/0088576 | A1 * | 3/2018 | Kong | B60W 30/16 |
| 2020/0225655 | A1 | 7/2020 | Cella et al. | |
| 2022/0194446 | A1 | 6/2022 | Akif et al. | |
| 2022/0314833 | A1 * | 10/2022 | Jiang | B60L 53/66 |
| 2023/0029492 | A1 * | 2/2023 | Zuo | H02J 7/927 |
| 2025/0018819 | A1 * | 1/2025 | Endo | B60L 53/65 |

FOREIGN PATENT DOCUMENTS

| | | | | |
|---|---|---|---|---|
| CN | 113644671 | A | 11/2021 | |
| CN | 114268147 | A * | 4/2022 | |
| CN | 116325420 | A * | 6/2023 | H02J 7/0048 |
| CN | 121036281 | A * | 11/2025 | |
| KR | 20150135843 | A * | 12/2015 | H02J 7/60 |

OTHER PUBLICATIONS

Zhong Zhihong, "Optimization of Regenerative Braking Performance of Urban Rail Train Considering Onboard and Wayside Energy Storage Device", China Doctoral Dissertations Full-text Database, Issue 2, Feb. 15, 2022, C033-59.

* cited by examiner

METHOD, MODEL, DEVICE AND STORAGE MEDIUM FOR CONTROLLING AN ENERGY STORAGE SYSTEM FOR RAIL TRANSIT

CROSS-REFERENCE OF RELATED APPLICATIONS

This application claims priority to Chinese patent application No. 2202211330885.2, filed with the China National Intellectual Property Administration on Oct. 27, 2022 and entitled "METHOD, MODEL, DEVICE AND STORAGE MEDIUM FOR CONTROLLING AN ENERGY STORAGE SYSTEM FOR RAIL TRANSIT", the disclosure of which is hereby incorporated by reference in its entirety.

TECHNICAL FIELD

The present application relates to the field of energy storage system control technologies, and in particular, to a method, a model, a device and a storage medium for controlling an energy storage system for rail transit.

BACKGROUND

Rail transit is an important part of a transportation system, and urban rail transit is one type of rail transit. With the rapid development of urban rail transit, the power consumption of urban rail transit has increased significantly. Therefore, it is of great significance to reduce traction energy consumption of urban rail transit for energy conservation and emission reduction of the whole society. The key to reducing the energy consumption of an urban rail transit system is improving the ability of an urban rail traction power supply system to receive regenerative energy and making full use of regenerative braking energy from trains. However, at present, the regenerative energy absorption load of an urban rail power supply system is very limited. Most traction substations use a unidirectional diode rectifier, and regenerative braking energy cannot be fed back to an AC power grid. When there is no traction train near a braking train for regenerative energy absorption, braking energy is wasted in a braking resistor. The utilization of regenerative energy from trains through an energy storage system is of great significance for the sustainable development of the urban rail industry.

Considering the characteristics of frequent braking and high braking power of urban rail trains, a supercapacitor energy storage element has been widely studied and used in the field of rail transit with its advantage of high power density. However, in one aspect, as the power and position of an urban rail train changes in real time, the parameters and topology of a traction power supply system have nonlinear and time-varying characteristics, making the whole optimization model very complex. In another aspect, the voltage level of an urban rail power supply system is low, and changes in various operating parameters of the system may have great impact on the transmission of energy, affecting the energy-saving rate of an energy storage system. When the characteristics of trains, lines, and substations are not taken into consideration and charging-discharging actions of the energy storage system are adjusted in real time, the energy-saving rate of the energy storage system shows large fluctuations with external conditions, and may even intensify the waste of energy in the case of large intervals between train departures, which is the bottleneck limiting the large-scale application of the energy storage system in urban rail transit. Therefore, it is very important to optimize the energy flow of the urban rail power supply system and improve the energy-saving rate of the energy storage system by fully considering the characteristics of trains, energy storage apparatuses, lines, and substations.

Existing energy management strategies for energy storage apparatuses are mostly fixed threshold strategies, as shown in FIG. 1. Through an offline optimization algorithm, a fixed charging threshold Uchar and a fixed discharging threshold Udis are set. When a traction network voltage is greater than the charging threshold, an energy storage apparatus is charged. When the traction network voltage is less than the discharging threshold, the energy storage apparatus is discharged. This method fails to fully consider the characteristics of trains, energy storage apparatuses, lines, and substations, and has low charging and discharging efficiency and a high regeneration failure rate. Uchar is a charging threshold. Udis is a discharging threshold. Udc is a traction network voltage at an energy storage apparatus. $I_L$* is a current instruction value of the energy storage apparatus. $I_L$ is an actual current of the energy storage apparatus. PWM represents a PWM wave for controlling an IGBT of a converter. To improve the charging efficiency of an energy storage system, some scholars have proposed a dynamic voltage-following charging threshold dynamic adjustment strategy, as shown in FIG. 2. Based on the position and power of a train, a terminal voltage of the train is dynamically maintained as a critical value of a starting voltage of a braking resistor, to maximize the energy interaction between trains, thereby enhancing the energy-saving efficiency of the energy storage system. $i_r$ is a line current of a loop from a train to an energy storage apparatus. $x_t$ is a distance between the train and the energy storage apparatus. $\rho_n$ is a unit length equivalent resistance of a power supply track and a current return track. $u_{br}$ is a terminal voltage of a braking resistor. $i_{tb}$ is a current flowing through the braking resistor. $r_t$ is a contact resistance of the train. $u_{cmd}$ is a voltage instruction value of a traction network of the energy storage apparatus. $u_{br}$ is a starting voltage of the braking resistor. $u_{oc}$ is a no-load voltage of a substation. $u_{ch}$ is a charging threshold of the energy storage apparatus. $u_t$ is a traction network voltage of an energy storage apparatus end. $G_{vc}$ is a PI of a voltage loop. $i_{up}$ and $i_{down}$ are respectively an upper limit and a lower limit of a current of the energy storage apparatus. icmd is a current instruction value of the energy storage apparatus. $G_{ic}$ is a PI of a voltage loop of the energy storage apparatus. it is an actual current of the energy storage apparatus. $d_1$ and $d_2$ are respectively duty cycles of two bridge arms of an IGBT.

Neither of the foregoing algorithms can implement globally optimal control, some scholars consider that the solution determination of an optimal control strategy of an energy storage apparatus is a sequential decision-making optimization problem. As shown in FIG. 3, a reinforcement learning algorithm is introduced to adjust control parameters of an energy storage apparatus on line to adapt to changes in working conditions of a power supply system, to enable an energy storage system to implement good energy saving and voltage stabilization. However, the algorithm has poor robustness.

SUMMARY

In view of this, embodiments of the present application provide a method and a model for controlling an energy storage system for rail transit, a device, and a storage medium, to resolve the technical problem that existing energy storage control methods have poor robustness.

The technical solution provided in the present application is as follows.

A first aspect of embodiments of the present application provides a method for controlling an energy storage system for rail transit, including: determining an offline charging-discharging action according to a state of an energy storage system based on an offline algorithm; determining an online charging-discharging action according to the state of the energy storage system based on a deep reinforcement learning algorithm; acquiring a fusion ratio of the offline charging-discharging action to the online charging-discharging action according to a communication delay amount and a delay degree; and fusing the offline charging-discharging action and the online charging-discharging action according to the fusion ratio and outputting a fusion result to the energy storage system.

In an embodiment of the present application, the step of determining an online charging-discharging action according to the state of the energy storage system based on a deep reinforcement learning algorithm includes: receiving the state of the energy storage system and the offline charging-discharging action; using the offline charging-discharging action as an initial value of a neural network and training the neural network using training data, where the neural network outputs an action-value function according to the state of the energy storage system; and acquiring the online charging-discharging action based on the action-value function and a greedy strategy.

In an embodiment of the present application, the step of determining an online charging-discharging action according to the state of the energy storage system based on a deep reinforcement learning algorithm further includes: storing used training data, and randomly extracting training data from the used training data to train the neural network again.

In an embodiment of the present application, before the step of determining an offline charging-discharging action according to a state of an energy storage system based on an offline algorithm, the method further includes: acquiring an action interval of the energy storage system, where the state of the energy storage system includes a state of a substation, a state of a train, and a state of an energy storage apparatus in the action interval.

In an embodiment of the present application, the step of acquiring an action interval of the energy storage system includes: selecting a central substation; determining whether impact of the train at different positions on a terminal voltage of the central substation is greater than a threshold voltage; and when the impact is greater than the threshold voltage, determining that the action interval includes the central substation and a substation where the train is located.

In an embodiment of the present application, the step of acquiring a fusion ratio of the offline charging-discharging action to the online charging-discharging action according to a communication delay amount and a delay degree includes: acquiring a correspondence between any communication delay amount and delay degree and the fusion ratio through pre-training; and based on the correspondence, acquiring the fusion ratio of the offline charging-discharging action to the online charging-discharging action according to the communication delay amount and the delay degree.

In an embodiment of the present application, the step of acquiring a correspondence between any communication delay amount and delay degree and the fusion ratio through pre-training includes: initializing the fusion ratio; under any communication delay amount and delay degree, acquiring the online charging-discharging action according to the state of the energy storage system; acquiring the offline charging-discharging action according to the state of the energy storage system; calculating a fused charging-discharging action based on the online charging-discharging action, the offline charging-discharging action and the fusion ratio; performing the offline charging-discharging action and the fused charging-discharging action separately, to obtain a first reward signal that is based on the fused charging-discharging action and a second reward signal that is based on the offline charging-discharging action; updating the fusion ratio based on the first reward signal and the second reward signal, where when the first reward signal is greater than the second reward signal, the fusion ratio is increased, and when the first reward signal is less than the second reward signal, the fusion ratio is reduced; and repeating the step of updating the fusion ratio until a change ratio of the fusion ratio reaches a termination value.

A second aspect of embodiments of the present application provides a model for controlling an energy storage system for rail transit, including: an offline generalization module, configured to determine an offline charging-discharging action according to a state of an energy storage system based on an offline algorithm; a deep reinforcement learning module, configured to determine an online charging-discharging action according to the state of the energy storage system based on a deep reinforcement learning algorithm; and a robustness enhancement module, configured to: acquire a fusion ratio of the offline charging-discharging action to the online charging-discharging action according to a communication delay amount and a delay degree; and fuse the offline charging-discharging action and the online charging-discharging action according to the fusion ratio and output a fusion result to the energy storage system.

A third aspect of embodiments of the present application provides an electronic device, including: a memory and a processor, where the memory and the processor are in communication connection with each other, the memory stores computer instructions, and the processor is configured to execute the computer instructions to perform the method for controlling an energy storage system for rail transit according to the first aspect of the embodiments of the present application or any implementation of the first aspect.

A fourth aspect of embodiments of the present application provides a computer-readable storage medium, where the computer-readable storage medium stores computer instructions, and the computer instructions are used for enabling a computer to perform the method for controlling an energy storage system for rail transit according to the first aspect of the embodiments of the present application or any implementation of the first aspect.

As can be seen from the foregoing technical solutions, the embodiments of the present application have the following advantages:

For the method and model for controlling an energy storage system for rail transit, the device, and the storage medium provided in the embodiments of the present application. The method includes: determining an offline charging-discharging action according to a state of an energy storage system based on an offline algorithm; determining an online charging-discharging action according to the state of the energy storage system based on a deep reinforcement learning algorithm; acquiring a fusion ratio of the offline charging-discharging action to the online charging-discharging action according to a communication delay amount and a delay degree; and fusing the offline charging-discharging action and the online charging-discharging action according to the fusion ratio and outputting a fusion result to the energy storage system. In the embodiments of the present application, a fusion ratio is acquired according to a communication delay amount and a delay degree, an offline charging-discharging action and an online charging-discharging action are fused according to the fusion ratio, and a fusion result is outputted to the energy storage system. The system can run normally in different communication environments, so that the robustness of the system is improved.

BRIEF DESCRIPTION OF THE DRAWINGS

For clearer descriptions of the technical solutions in the embodiments of the present application, the following briefly introduces the accompanying drawings required for describing the embodiments. Apparently, the accompanying drawings in the following description show only some embodiments of the present application, and persons of ordinary skill in the art may still derive other drawings from these accompanying drawings without creative efforts.

DETAILED DESCRIPTION

To enable a person skilled in the art to better understand the solutions of the present application, the technical solutions of the embodiments of the present application will be described below clearly and comprehensively in conjunction with the drawings of the embodiments of the present application. Clearly, the embodiments described are merely some embodiments of the present application and are not all the possible embodiments. All other embodiments obtained by persons of ordinary skill in the art based on the embodiments of the present application without creative efforts fall within the protection scope of the present application.

Figure 1:
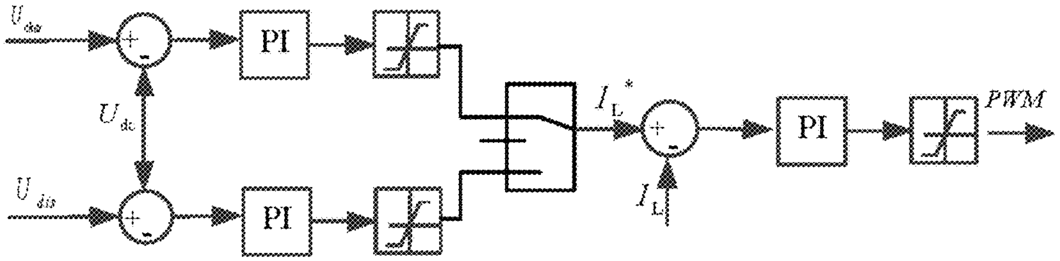
FIG. 1 is a schematic framework diagram of a fixed threshold strategy according to an embodiment of the present application.
Figure 2:
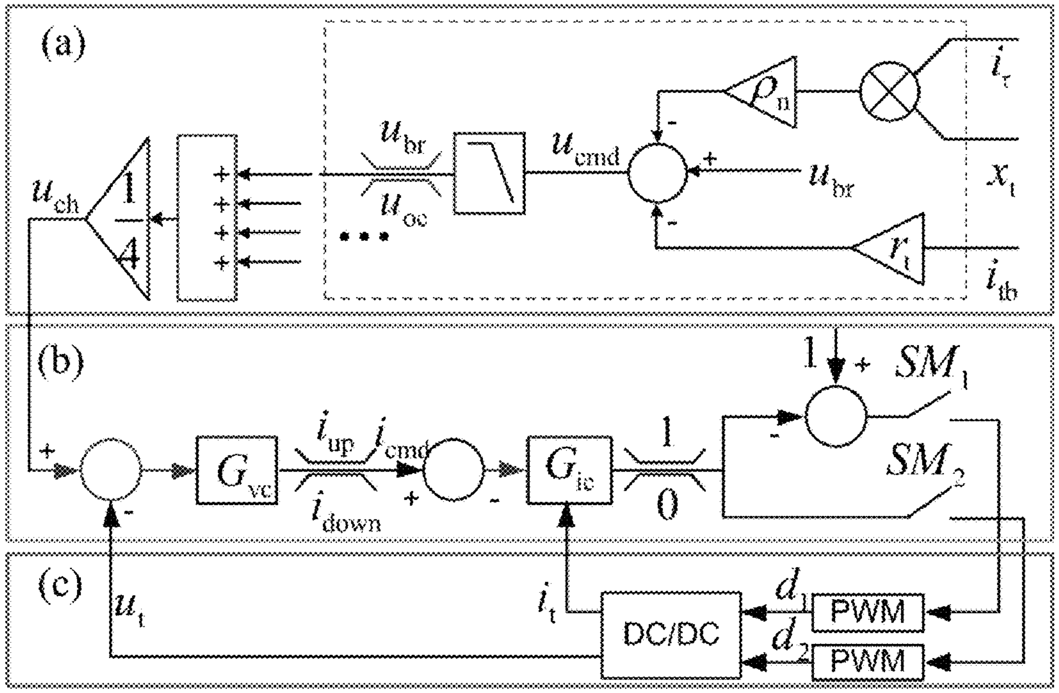
FIG. 2 is a schematic framework diagram of a dynamic voltage-following charging threshold dynamic adjustment strategy according to an embodiment of the present application.
Figure 3:
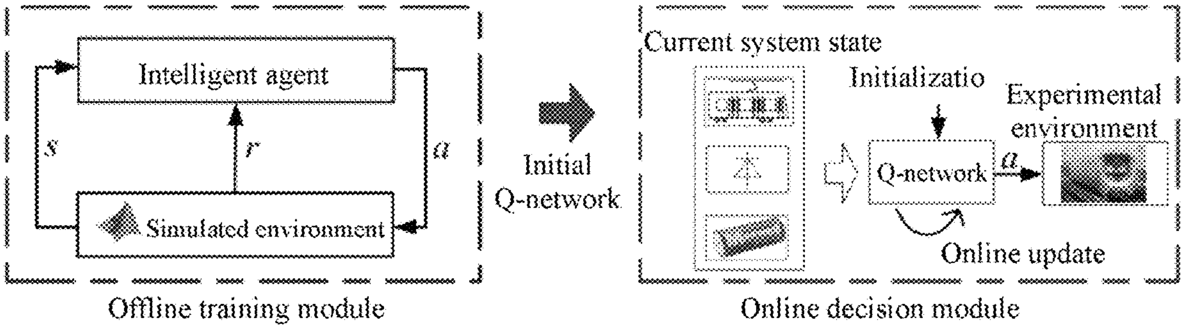
FIG. 3 is a schematic framework diagram of a globally optimal control strategy according to an embodiment of the present application.
Figure 4:
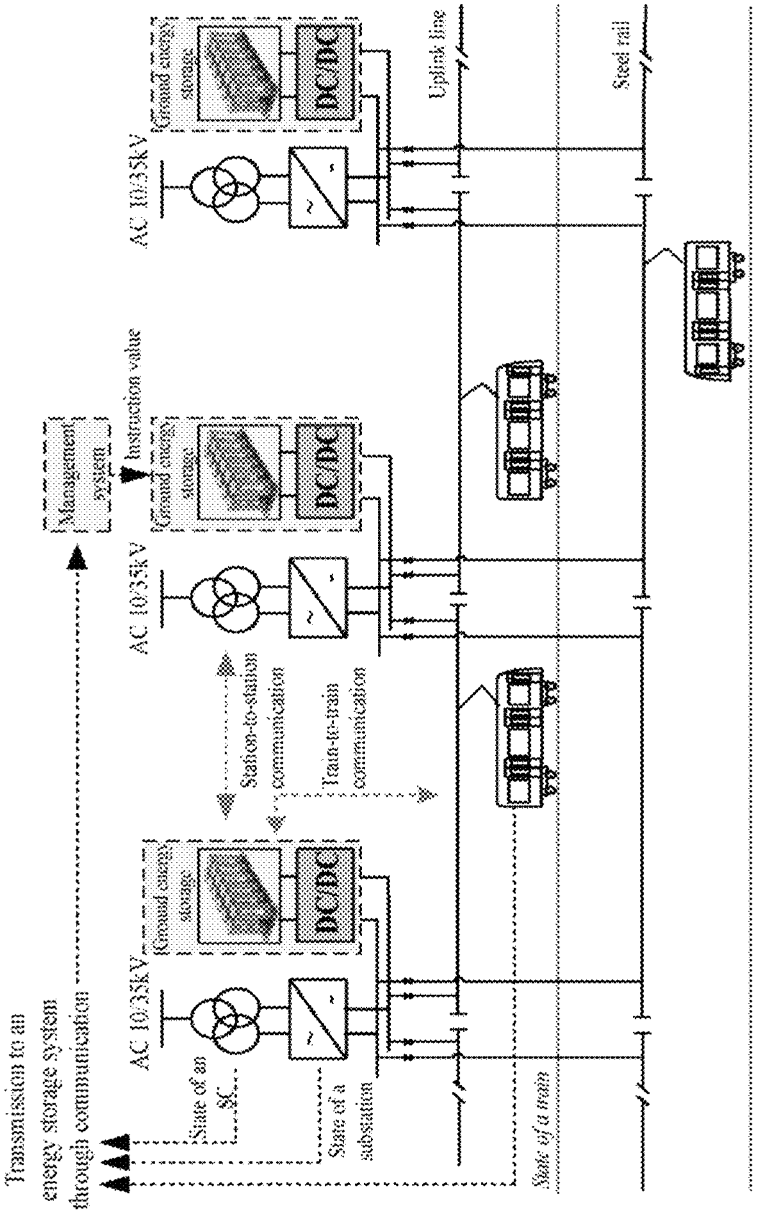
FIG. 4 is a diagram of a topological structure of an energy storage system for rail transit according to an embodiment of the present application.

An application scenario of a method for controlling an energy storage system for rail transit in embodiments of the present application is an information exchange-based ground energy storage apparatus. FIG. 4 is a system topology diagram of a train power supply system including the ground energy storage apparatus. The energy storage system includes a management system and a ground energy storage. The energy storage system is installed in a substation, and is connected to a direct current bus in parallel by a bidirectional buck/boost topology. A state of a train, a state of a substation, and a state of an SC is transmitted to the energy storage system through communication.

Figure 5:
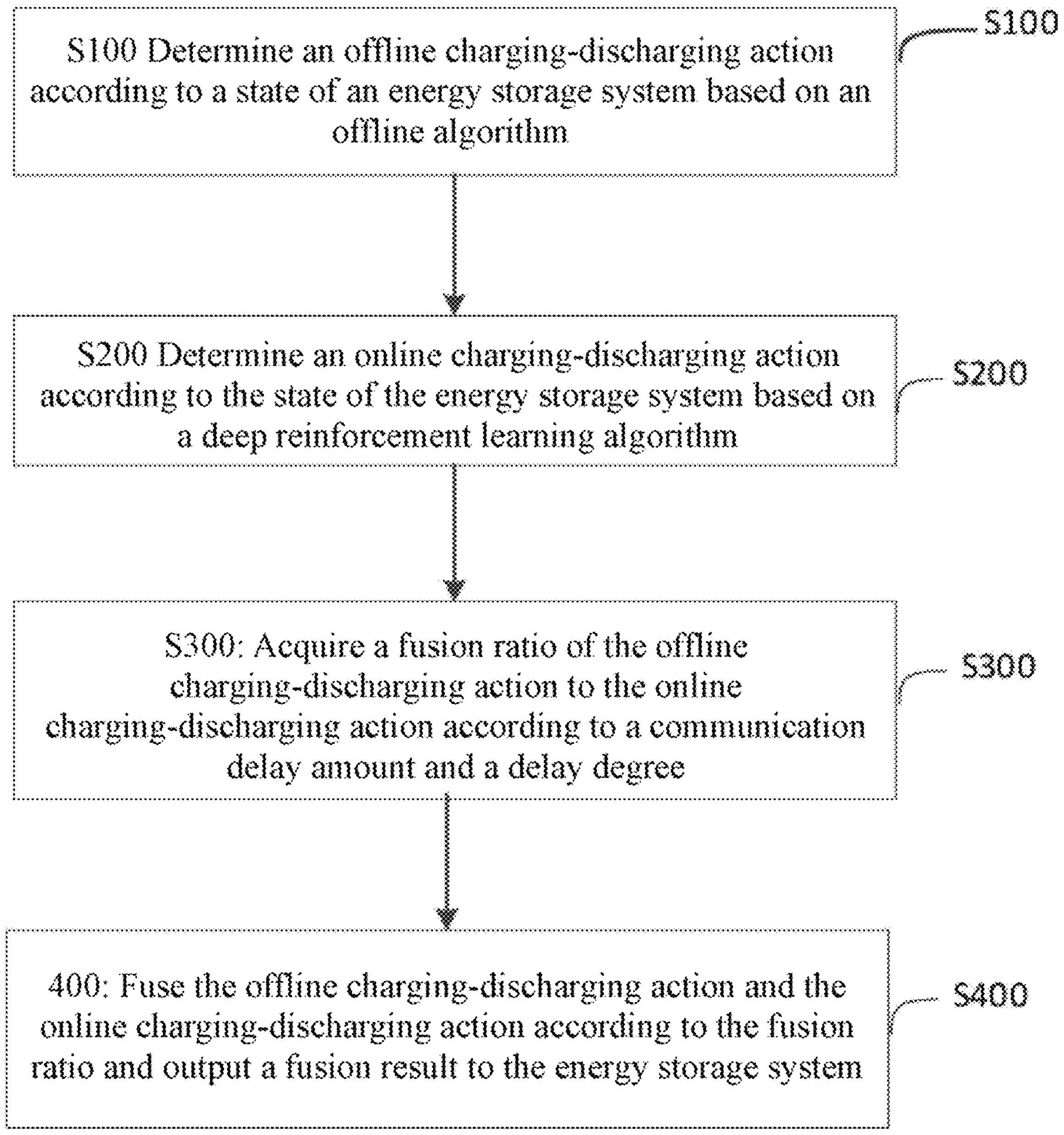
FIG. 5 is a flowchart of a method for controlling an energy storage system for rail transit according to an embodiment of the present application.
Figure 6:
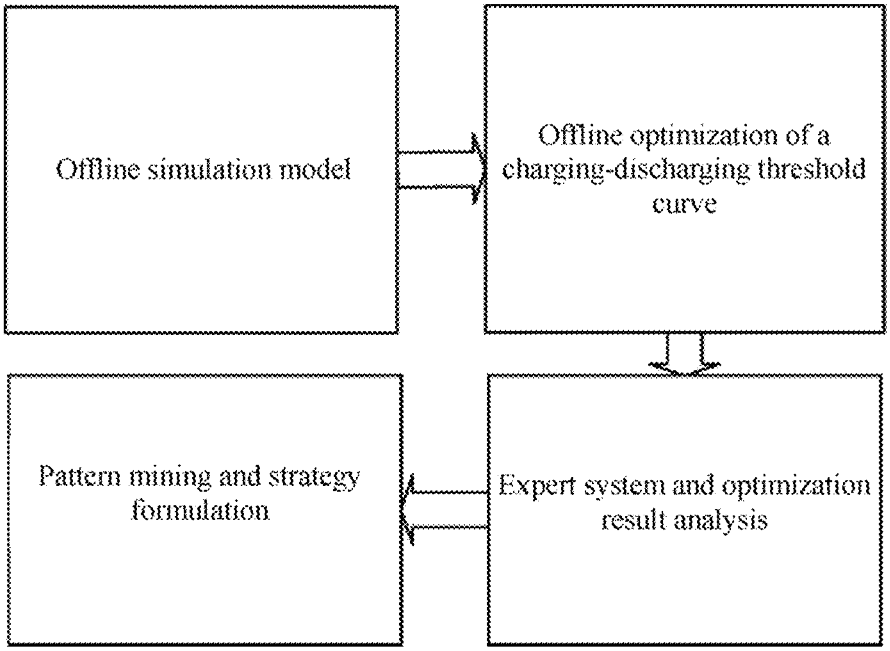
FIG. 6 is a flowchart of training an offline generalization module according to an embodiment of the present application.
Figure 7:
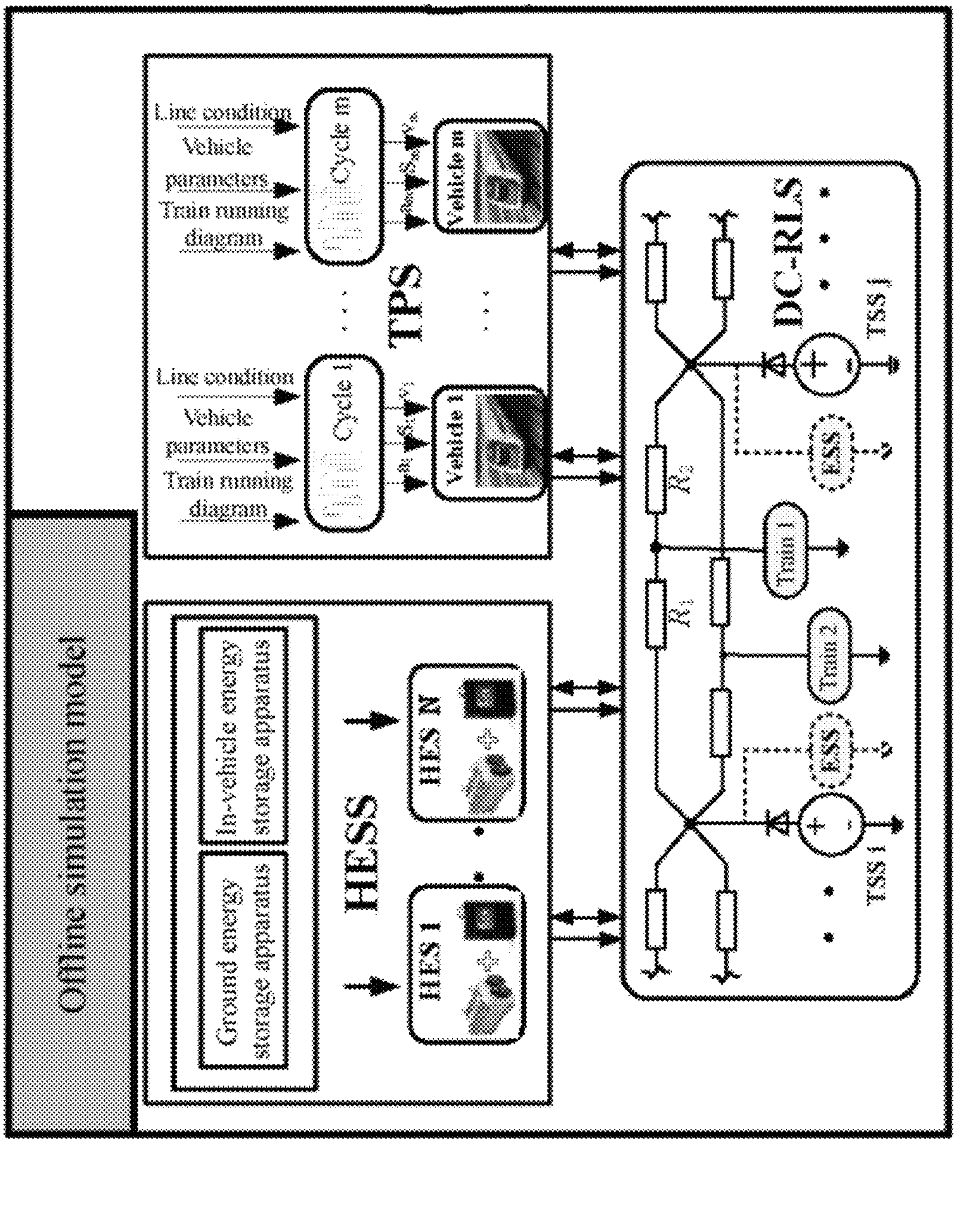
FIG. 7 is a schematic framework diagram of an offline simulation model according to an embodiment of the present application; $R_1$ and $R_2$ are respectively resistance values of lines from a train 1 (Train1) to a substation on the left and a substation on the right. TSS represents a traction substation. ESS represents an energy storage apparatus. Train represents a train. HESS is a hybrid energy storage configuration part. TPS is a train traction calculation part. DC-RLS is a direct current eddy current simulation part.
Figure 8:
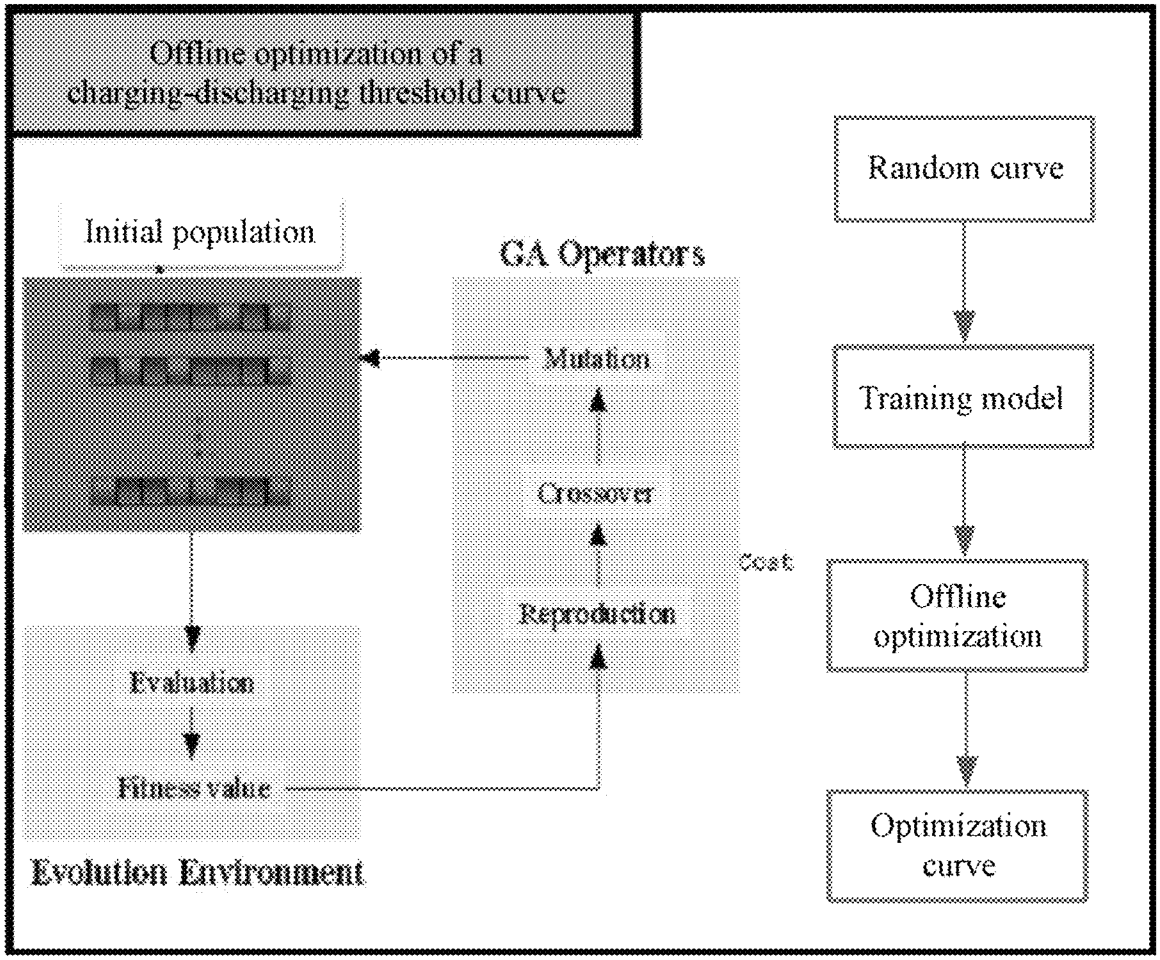
FIG. 8 is a schematic framework diagram of offline optimization of a charging-discharging threshold curve according to an embodiment of the present application.
Figure 9:
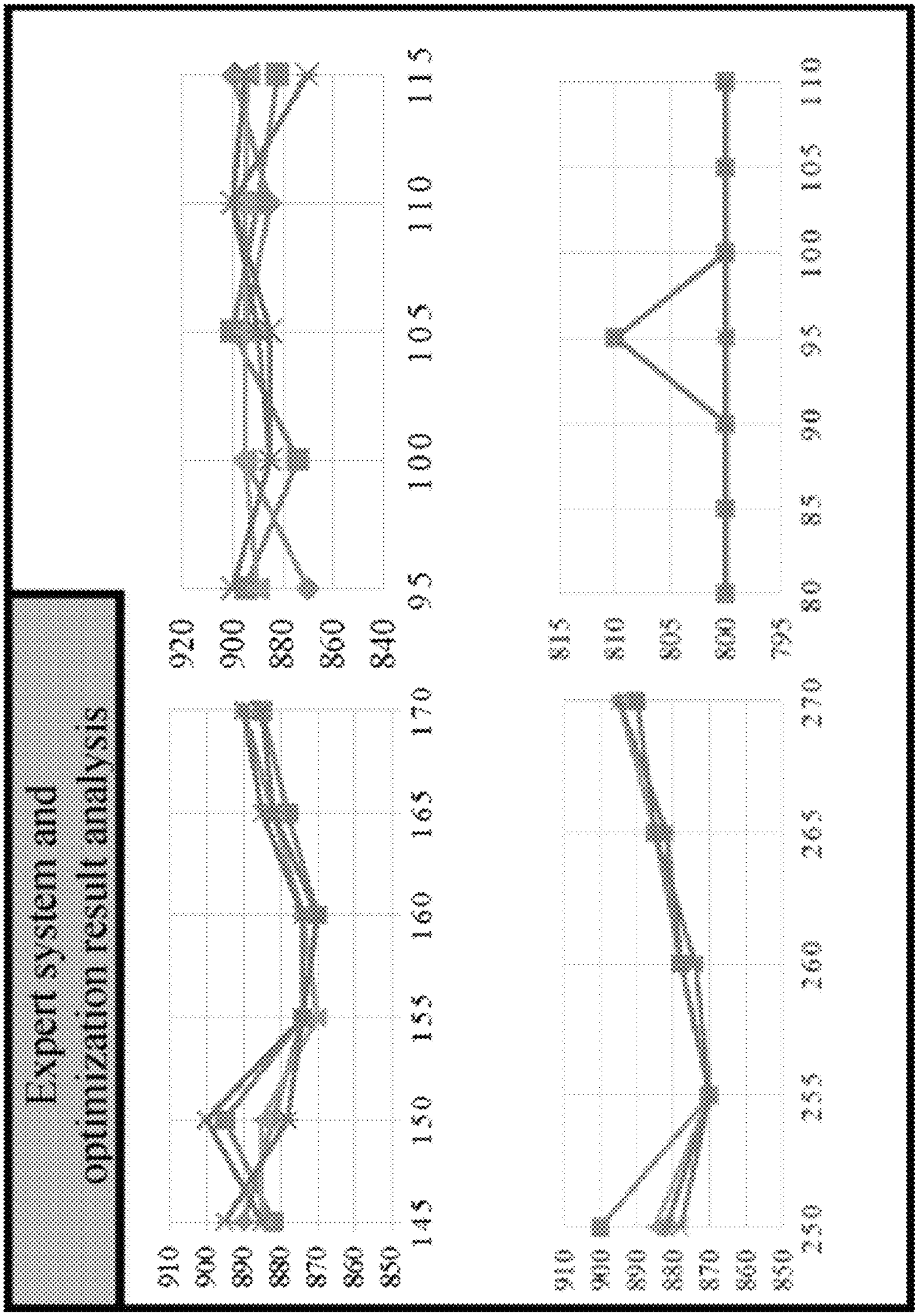
FIG. 9 is a schematic diagram of an offline pattern table according to an embodiment of the present application.
Figure 10:
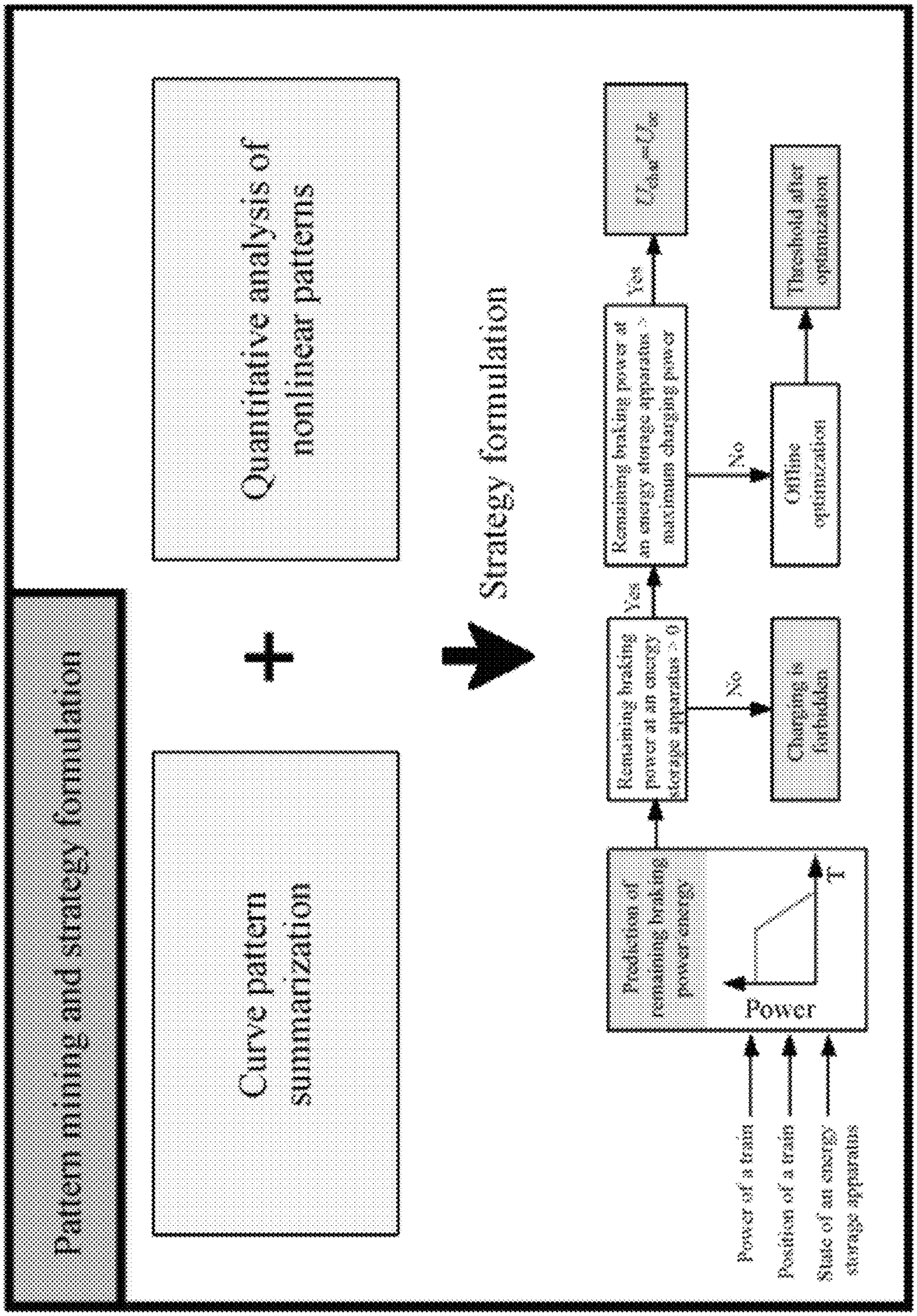
FIG. 10 is a schematic framework diagram of pattern mining and strategy formulation according to an embodiment of the present application.

A method for controlling an energy storage system for rail transit provided in embodiments of the present application is shown in FIG. 5, and includes:

Step S100: Determine an offline charging-discharging action according to a state of an energy storage system based on an offline algorithm. Specifically, an offline generalization module is constructed based on the offline algorithm. The offline generalization module is an analytical mode with a state as an input and a decision as an output. For example, an initial offline generalization module is obtained based on offline training and pattern mining. A training process of the offline generalization module is shown in FIG. 6 to FIG. 10, and includes four parts: an offline simulation model, offline optimization of a charging-discharging threshold curve, expert system and optimization result analysis, and pattern mining and strategy formulation. The initial offline generalization module is trained based on typical working conditions of an offline simulation model of a train power supply system, to obtain an offline optimization charging-discharging threshold curve. An offline pattern table is then obtained by using an expert system. Finally, patterns are mined and extracted, and then strategy formulation is implemented, so that an eventual offline generalization model may be obtained. Inputs of the offline generalization model are the powers and positions of adjacent trains and an SOC of the energy storage system, and the output is an offline charging-discharging action, that is, a charging-discharging threshold, of a current energy storage apparatus. Specifically, based on the offline simulation model and an offline optimization algorithm such as a genetic algorithm, dynamic planning, and the like, under various working conditions, an optimal charging-discharging threshold curve is optimized, to obtain a large amount of data with the powers and positions of the adjacent trains and the SOC of the energy storage system as inputs and an optimal charging-discharging threshold as an output. The expert system is a computer determination system using existing experience and knowledge as basic rules to replace decision making of humans. The expert system automatically extracts data segments with a pattern from the data, and automatically describes a relationship between the pattern and an input, and integrates the pattern. Then patterns are categorized according to linearity. Nonlinear patterns are further mined. That is, an analytical solution form between an input and an output is established in a manner of determining an analytical solution. A pattern integration process has divided a global optimization problem into local optimization problems, so that an analytical solution may be calculated.

Step S200: Determine an online charging-discharging action according to the state of the energy storage system based on a deep reinforcement learning algorithm. Specifically, the deep reinforcement learning algorithm is a deep Q-learning (DQN) algorithm, and uses a neural network to approximate an action value function. An action selection strategy of the deep reinforcement learning algorithm is an ε-greedy strategy. That is, an action of a maximum action-value function is selected with a certain probability ε, and another strategy is randomly selected with a probability 1−ε. Parameters in the network are updated by using a gradient descent method. Through continuous cycles, a final action corresponding to the maximum action-value function may be an optimal action. The online charging-discharging action is a value outputted through operation using the deep reinforcement learning algorithm. After the state of the energy storage system is acquired, an online charging-discharging action, that is, an online learning-based charging-discharging threshold is obtained through analysis according to the deep reinforcement learning algorithm.

Step S300: Acquire a fusion ratio of the offline charging-discharging action to the online charging-discharging action according to a communication delay amount and a delay degree. In an application scenario of urban rail transit, a delay is usually a sum of a program processing delay of sending, a transmission delay, and a program processing delay of receiving. The program processing delays are relatively fixed. However, the transmission delay is not fixed. A packet loss mainly occurs in an electromagnetic wave transmission process, which may encounter interference from other strong electromagnetic fields, and may suffer from a signal loss. Through training, when a communication delay amount is larger and a delay degree higher, a value of the fusion ratio is smaller.

Step S400: Fuse the offline charging-discharging action and the online charging-discharging action according to the fusion ratio and output a fusion result to the energy storage system. Specifically, output proportions of the offline charging-discharging action and the online charging-discharging action are determined according to the fusion ratio. When the value of the fusion ratio is smaller, the proportion of the offline charging-discharging action is larger, and the proportion of the online charging-discharging action is smaller. When the value of the fusion ratio is larger, the proportion of the offline charging-discharging action is smaller, and the proportion of the online charging-discharging action is larger. When a communication loss is high, that is, a reinforcement learning state is not complete, an online charging-discharging action result outputted by the deep reinforcement learning algorithm is poor. Therefore, when a communication state is poor, the proportion of the offline charging-discharging action can be increased, an output is kept stable, and the robustness of the system is enhanced.

For the method for controlling an energy storage system for rail transit provided in the embodiments of the present application. The method includes: determining an offline charging-discharging action according to a state of an energy storage system based on an offline algorithm; determining an online charging-discharging action according to the state of the energy storage system based on a deep reinforcement learning algorithm; acquiring a fusion ratio of the offline charging-discharging action to the online charging-discharging action according to a communication delay amount and a delay degree; and fusing the offline charging-discharging action and the online charging-discharging action according to the fusion ratio and outputting a fusion result to the energy storage system. In the embodiments of the present application, a fusion ratio is acquired according to a communication delay amount and a delay degree, an offline charging-discharging action and an online charging-discharging action are fused according to the fusion ratio, and a fusion result is outputted to the energy storage system. The system can run normally in different communication environments, so that the robustness of the system is improved.

In an embodiment, the step of determining an online charging-discharging action according to the state of the energy storage system based on a deep reinforcement learning algorithm includes: receiving the state of the energy storage system and the offline charging-discharging action; using the offline charging-discharging action as an initial value of a neural network and training the neural network using training data, where the neural network outputs an action-value function according to the state of the energy storage system; and acquiring the online charging-discharging action based on the action-value function and a greedy strategy. Specifically, the neural network is a Q network. The Q network is trained by using a gradient descent algorithm. The algorithm implements updating of network parameters by minimizing root mean squared errors of a target network and the Q network. The action-value function is configured to represent a relationship between a used action and a generated benefit in a current state. In this embodiment, the action-value function is simulated by using a neural network. That is, a current state S is inputted, and a current Q(s, a) may be outputted, and a represents a corresponding action. That is, an action-value function of any action in a current state is obtained. Specifically, an action of the action-value function is a charging-discharging threshold. After the offline charging-discharging action is received, a maximum value is assigned to the action-value function corresponding to the offline charging-discharging action. That is, the offline charging-discharging action is used as the initial value of the neural network. In this case, this action is most likely to be selected as an output of the deep reinforcement learning algorithm, so that a trial and error process of the deep reinforcement learning algorithm can be reduced, and the concept of behavior cloning is introduced, to improve generalization capability of the algorithm. After receiving the state of the energy storage system, the Q network outputs the action-value function based on the state of the energy storage system, and then acquires the online charging-discharging action by using the greedy strategy. The greedy strategy is selecting an action of a maximum action-value function in the current state with a certain probability, or otherwise selecting a random action. The initial value of the neural network may be a group of initial values obtained through offline training. However, such an initial value is related to a model, and training is required again when another model is used. However, an offline algorithm is directly obtained relationship in an analytical form between an input and an output, and is not related to the model. When an output of the offline algorithm is used as an initial value, it is not necessary to perform offline training once first each time.

In an embodiment, the step of determining an online charging-discharging action according to the state of the energy storage system based on a deep reinforcement learning algorithm further includes: storing used training data, and randomly extracting training data from the used training data to train the neural network again. Specifically, the neural network is specifically a Q network. The Q network is trained by using a gradient descent algorithm. The gradient descent algorithm implements updating of network parameters by minimizing root mean squared errors of a target network and the Q network. The target network is the same as the Q network, and is obtained by copying the Q network. Operations of the gradient descent algorithm are shown in the following formula:

$$L(\theta)=\frac{1}{N}\sum_{k=1}^{N}[r_k+\gamma\max Q(s_k',a_k',\theta^-)-Q(s_k,a_k,\theta)]^2 \tag{1}$$

N is a scale of a small batch of data used for performing the gradient descent algorithm. $\theta^-$ is a weight of the target network. θ is a weight of the Q network. $s_k$ and $a_k$ are a current state and a current action. $s_k'$ and $a_k'$ are a state and an action at a next moment. $r_k$ is a current reward signal. γ is an algorithm parameter. To break relevance between training data and improve the stability of the algorithm, used training data, that is, experience data tuples are stored in an experience replay pool. During training, data in the experience replay pool is randomly sampled.

Figure 11:
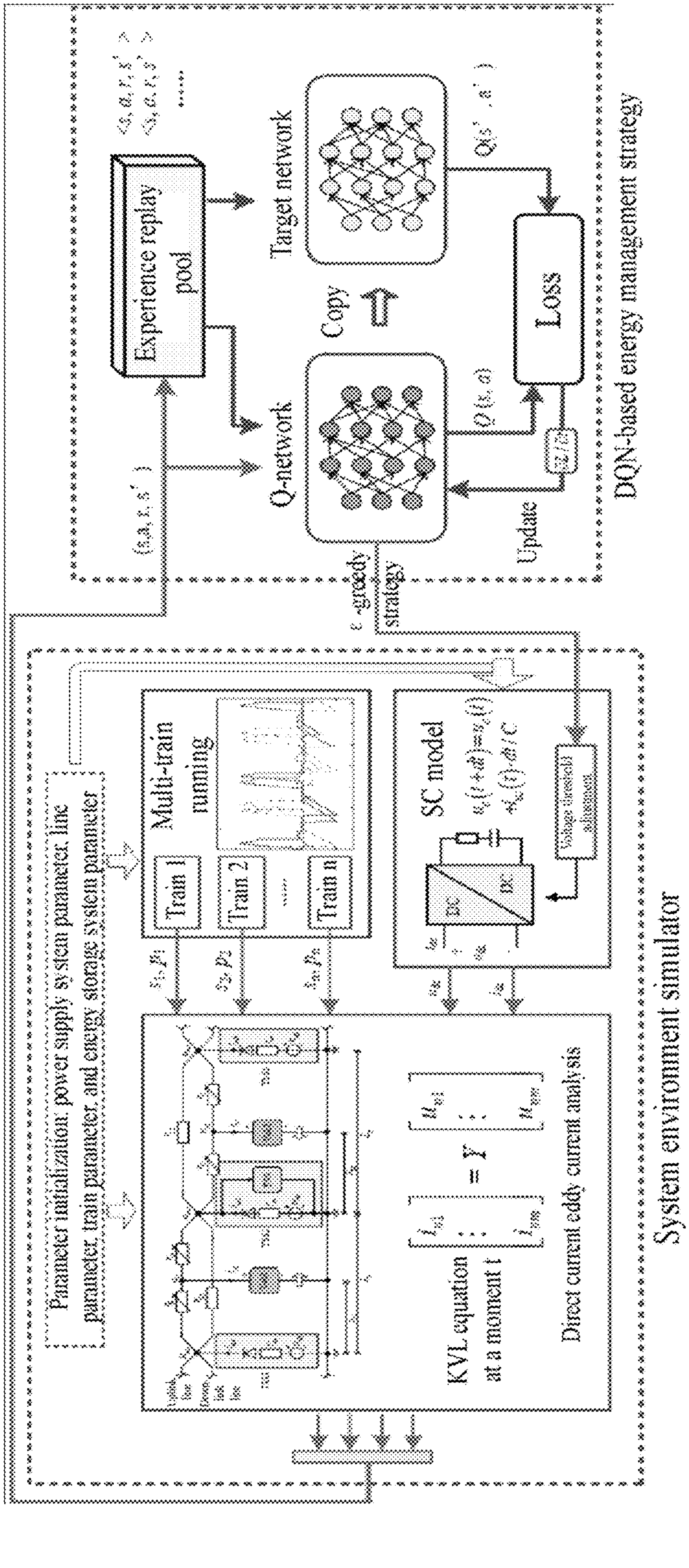
FIG. 11 is a framework diagram of network training of a deep reinforcement learning algorithm according to an embodiment of the present application.

Referring to FIG. 11, in the embodiments of the present application, used training data is stored in the experience replay pool. An experience replay module is a database that stores a plurality of experience data tuples. One experience data tuple is one piece of complete training data ($s_k$, $a_k$, $r_k$, $s_{k+1}$), which are respectively a current state, an optimal action in the current state, a reward in the current state, and a next state. [in1, in2, . . . , inm] are currents of branches. [un1, un2, . . . , unm] are voltages of the branches. Y is an admittance matrix. si and pi are respectively the position and power of an $i^{th}$ train. udc and idc are respectively a traction network voltage of an energy storage apparatus end and a feeding network current of an energy storage apparatus. (s, a, r, s*) are respectively a current status of a system, an action of an agent, a reward, and a status of the system after the agent performs an action. Q(s, a) is a Q function that performs an a action in a state s. An algorithm for training in combination with the experience replay pool is as follows:

initializing the experience replay pool, and initializing the Q network based on a random weight;

initializing the target network Q' based on a zero weight $\theta^-$;

repeating:

initializing a running state s based on the offline simulation model;

repeating:

in the state s, selecting an action a according to the ε-greedy strategy;

performing the action a in the offline simulation model;

determining a solution according to a circuit equation of the offline simulation model, to obtain a system state s' and a reward signal r at a next moment;

storing a state transfer tuple <a, r, s'> in the experience replay pool;

sampling a small batch state transfer array in the experience replay pool;

updating the parameter θ of the Q network by performing a gradient descent algorithm on Formula (1);

performing $\theta^-\leftarrow\theta$ every n steps;

terminating when s is a termination state, for example, a gradient of the gradient descent method approximates to 0 or terminating when iteration reaches an upper limit; and terminating when a termination condition of the algorithm is met, that is, every step meets a termination state.

In the embodiments of the present application, used training data is stored, and training data is randomly extracted from the used training data to train a neural network again. That is, experience data tuples are stored in an experience replay pool, and data is randomly sampled during training. Compared with that transmitted data is discarded immediately after one update, causing a waste of training data, and relevance between two consecutive times of training is increased, which is not conducive to model training, the embodiments of the present application break relevance between training data, thereby improving stability of an algorithm.

In an embodiment, before the step of determining an offline charging-discharging action according to a state of an energy storage system based on an offline algorithm, the method further includes: acquiring an action interval of the energy storage system, where the state of the energy storage system includes a state of a substation, a state of a train, and a state of an energy storage apparatus in the action interval. Specifically, based on circuit theories, upstream tracking and downstream tracking are performed on current distribution of an urban rail traction power supply system, to quantitatively represent a ratio relationship between a current of a substation and a current of a braking train and a current of a traction train. Based on a result of current tracking, upstream tracking and downstream tracking are performed on power distribution of the urban rail traction power supply system, to obtain a specific distribution coefficient between an output power of the substation and a power of the braking train and a power of the traction train and a line loss. Through the analysis of energy flow, a power flow path of the system may be intuitively and quantitatively presented, to divide an action interval of the energy storage system in real time, and transmission ratios in different intervals of energy are calculated in real time. According to the powers of the adjacent trains, a maximum energy control region, that is, an action interval, is calculated and outputted. The action interval is configured to determine a scale that the deep reinforcement learning algorithm needs to learn. The state of the substation, the state of the train, and the state of the energy storage apparatus in the action interval are learned as one whole state. The selection of an appropriate action interval is conducive to quick convergence of the deep reinforcement learning algorithm.

Figure 12:
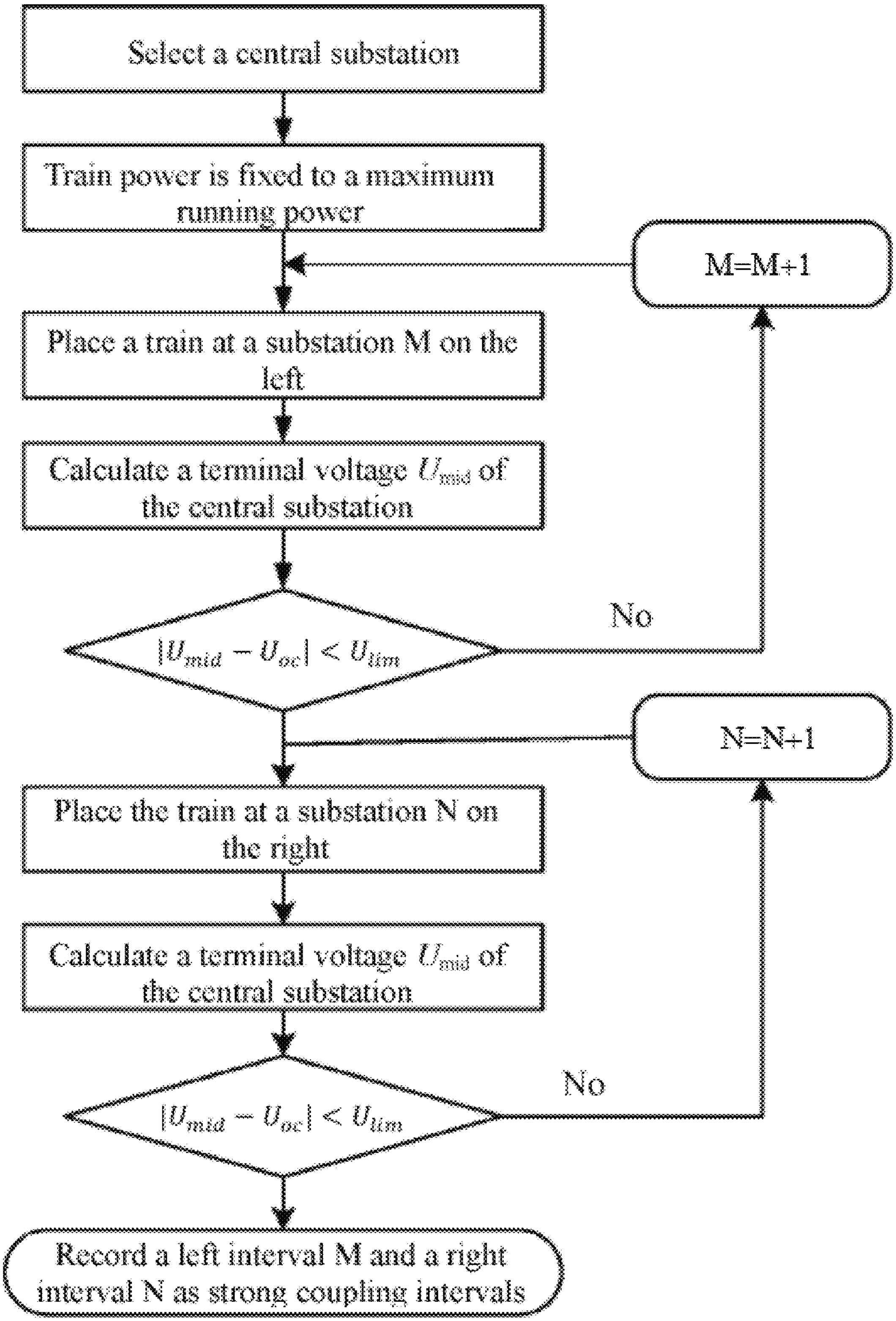
FIG. 12 is a flowchart of acquiring an action interval according to an embodiment of the present application.

In an embodiment, the step of acquiring an action interval of the energy storage system includes: selecting a central substation; determining whether impact of the train at different positions on a terminal voltage of the central substation is greater than a threshold voltage; and when the impact is greater than the threshold voltage, determining that the action interval includes the central substation and a substation where the train is located. Specifically, as shown in FIG. 12, one central substation is randomly selected as a control object, and an electrical coupling strength is defined according to the magnitude of fluctuations in network voltages of the central substation caused when the train runs in an interval near the central substation. Then, a power of the train is fixed as a maximum running power, and searches are separately made to the left and the right for a strong coupling interval, and an action interval is the strong coupling interval. It is defined that Uoc is an output terminal voltage of the central substation when no train is running in a line. Umid is an output terminal voltage of the central substation when a train outputs a maximum running power at different positions. Ulim is a threshold voltage for determining a strong coupling interval and a weak coupling interval, and may be manually selected, usually 5 V. When it is determined that the impact of the train at different positions on the terminal voltage of the central substation is greater than the threshold voltage, the interval is determined as the strong coupling interval, or otherwise the interval is determined as the weak coupling interval.

In the embodiments of the present application, the action interval of the energy storage system is determined according to the impact of the train at different positions on the terminal voltage of the central substation, so that interval-based control is implemented, the problem that processing of information using an algorithm is excessively complex is avoided, and a convergence capability and an operation speed of an algorithm are improved.

In an embodiment, the step of acquiring the fusion ratio of the offline charging-discharging action to the online charging-discharging action according to the communication delay amount and the delay degree includes:

Step S310: Acquire a correspondence between any communication delay amount and delay degree and the fusion ratio through pre-training. Specifically, actions obtained after the offline charging-discharging action and the online charging-discharging action are fused in different fusion ratios are run in a simulated environment, a good fusion ratio corresponding to a current communication delay amount and current delay degree is found according to running results, the fusion ratio is mapped to the current communication delay amount and delay degree to form a correspondence, and the correspondence is implemented through the neural network. Inputs of the neural network are the communication delay amount and the delay degree, and an output is the fusion ratio.

Step S320: Based on the correspondence, acquire the fusion ratio of the offline charging-discharging action to the online charging-discharging action according to the communication delay amount and the delay degree. After the correspondence between any communication delay amount and delay degree and the fusion ratio is acquired through pre-training, during actual running, the fusion ratio of the offline charging-discharging action to the online charging-discharging action is acquired based on a current actual communication delay amount and a current actual delay degree. The problem of a communication delay is considered in the embodiments of the present application, so that the robustness of the deep reinforcement learning algorithm is improved.

In an embodiment, the step of acquiring a correspondence between any communication delay amount and delay degree and the fusion ratio through pre-training includes:

Step S311: Initialize the fusion ratio. The fusion ratio is initialized to k=1.

Step S312: Under any communication delay amount and delay degree, acquire the online charging-discharging action according to the state of the energy storage system. The state of the energy storage system is acquired through the offline simulation model. After the state of the energy storage system is acquired, the online charging-discharging action is acquired by using the deep reinforcement learning algorithm.

Step S313: Acquire the offline charging-discharging action according to the state of the energy storage system. After the state of the energy storage system is acquired, the offline charging-discharging action is acquired by using the offline algorithm.

Step S314: Calculate a fused charging-discharging action based on the online charging-discharging action, the offline charging-discharging action and the fusion ratio. Specifically, the fused charging-discharging action is a2. A calculation formula is: $a2=a*k+a1*(1-k)$. a is the online charging-discharging action, and a1 is the offline charging-discharging action.

Step S315: Perform the offline charging-discharging action and the fused charging-discharging action separately, to obtain a first reward signal that is based on the fused charging-discharging action and a second reward signal that is based on the offline charging-discharging action. The execution process is performed in the offline simulation model, and a corresponding reward signal may be obtained after a corresponding action is performed. The reward signal is a feedback for an agent action from the environment. The embodiments of the present application mainly focus on an energy-saving rate of an energy storage device. Therefore, the reward signal is an energy-saving rate in a time step size T (the step size T is a time interval of performing an algorithm once, and the energy-saving rate is: energy outputted by the energy storage apparatus/energy outputted by a substation).

Step S316: Update the fusion ratio based on the first reward signal and the second reward signal, where when the first reward signal is greater than the second reward signal, the fusion ratio is increased, and when the first reward signal is less than the second reward signal, the fusion ratio is reduced. Specifically, an update formula is: $k=k-c1*(r2-r1)$, $(r2>r1)$ and $k=k+c2*d(r1)$, $(r2<r1)$. r1 is the first reward signal, r2 is the second reward signal, and c1 and c2 are update step sizes, and may be adjusted as required. When r2 is greater than r1, a value of the fusion ratio k is updated to $k—c1*(r2—r1)$. When r2 is less than r1, the value of the fusion ratio k is updated to $k+c2*d(r1)$.

Step S317: Repeat the step of updating the fusion ratio until a change ratio of the fusion ratio reaches a termination value. For example, when a change ratio of the fusion ratio k is less than a number, for example, 0.001, a training process is ended.

Figure 13:
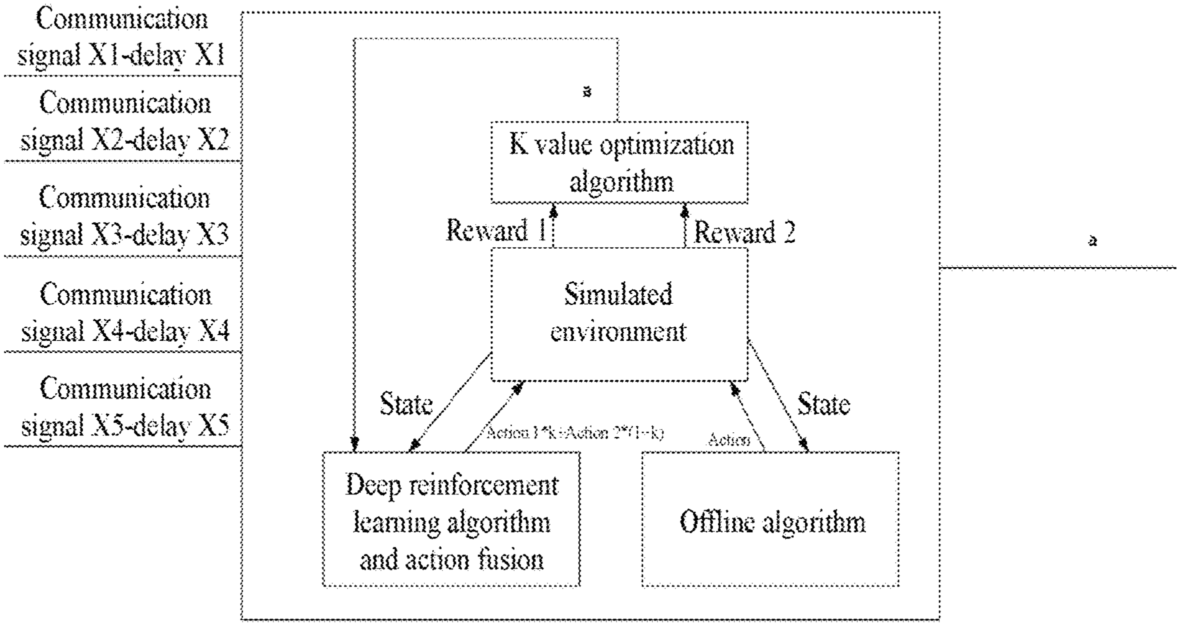
FIG. 13 is a flowchart of training a robustness enhancement model according to an embodiment of the present application.

Specifically, the foregoing pre-training step is implemented through a neural network. The neural network is trained to obtain a robustness enhancement model with a delay amount and a delay degree as inputs and an output as an optimal fusion ratio k. A training process of the robustness enhancement model is shown in FIG. 13. In the embodiments of the present application, an optimal fusion ratio is acquired through pre-training, so that an optimal output can be acquired when a communication state is poor, thereby enhancing the robustness of the system.

Figure 14:
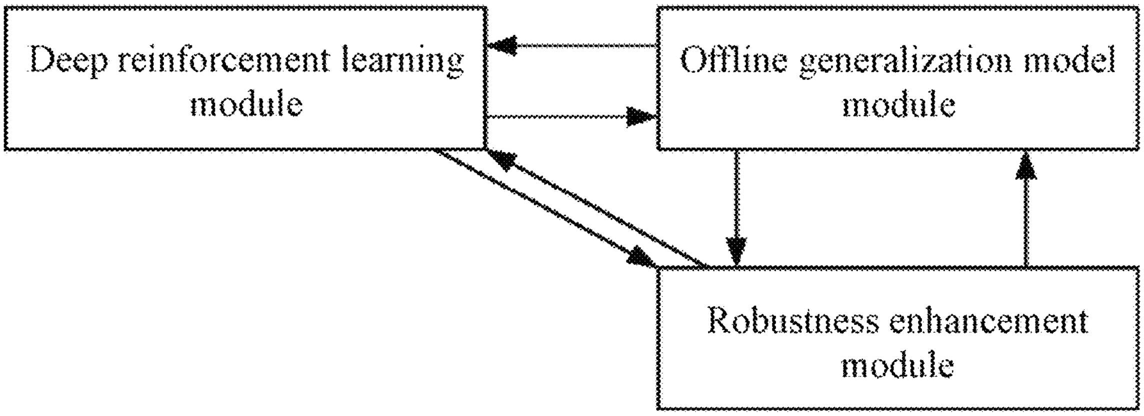
FIG. 14 is a block diagram of modules of a model for controlling an energy storage system for rail transit according to an embodiment of the present application.

An embodiment of the present application further provides a model for controlling an energy storage system for rail transit. As shown in FIG. 14, the apparatus includes an offline generalization module, a deep reinforcement learning module, and a robustness enhancement module.

The offline generalization module is configured to determine an offline charging-discharging action according to a state of an energy storage system based on an offline algorithm. For specific content, refer to the part corresponding to the foregoing method embodiment. Details are not described again herein.

The deep reinforcement learning module is configured to determine an online charging-discharging action according to the state of the energy storage system based on a deep reinforcement learning algorithm. For specific content, refer to the part corresponding to the foregoing method embodiment. Details are not described again herein.

The robustness enhancement module is configured to: acquire a fusion ratio of the offline charging-discharging action to the online charging-discharging action according to a communication delay amount and a delay degree; and fuse the offline charging-discharging action and the online charging-discharging action according to the fusion ratio and output a fusion result to the energy storage system. For specific content, refer to the part corresponding to the foregoing method embodiment. Details are not described again herein.

For the model for controlling an energy storage system for rail transit provided in the embodiments of the present application. The method includes: determining an offline charging-discharging action according to a state of an energy storage system based on an offline algorithm; determining an online charging-discharging action according to the state of the energy storage system based on a deep reinforcement learning algorithm; acquiring a fusion ratio of the offline charging-discharging action to the online charging-discharging action according to a communication delay amount and a delay degree; and fusing the offline charging-discharging action and the online charging-discharging action according to the fusion ratio and outputting a fusion result to the energy storage system. In the embodiments of the present application, a fusion ratio is acquired according to a communication delay amount and a delay degree, an offline charging-discharging action and an online charging-discharging action are fused according to the fusion ratio, and a fusion result is outputted to the energy storage system. The system can run normally in different communication environments, so that the robustness of the system is improved.

In an embodiment, the deep reinforcement learning module includes a receiving module, a network module, and a strategy module.

The receiving module is configured to receive the state of the energy storage system and the offline charging-discharging action.

The network module is configured to use the offline charging-discharging action as an initial value of a neural network and train the neural network using training data, where the neural network outputs an action-value function according to the state of the energy storage system.

The strategy module is configured to acquire the online charging-discharging action based on the action-value function and a greedy strategy.

Figure 15:
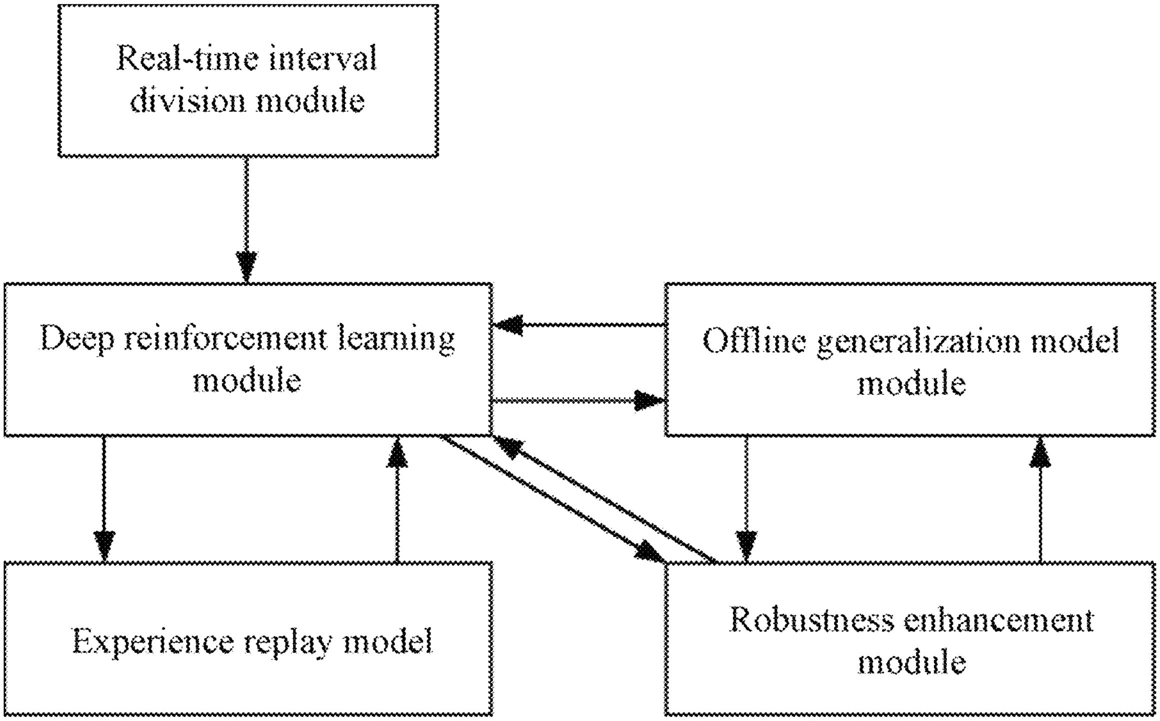
FIG. 15 is a block diagram of modules of another model for controlling an energy storage system for rail transit according to an embodiment of the present application.

In an embodiment, as shown in FIG. 15, the model for controlling an energy storage system for rail transit further includes an experience replay module, configured to: store used training data, and randomly extract training data from the used training data to train the neural network again.

In an embodiment, as shown in FIG. 15, the model for controlling an energy storage system for rail transit further includes a real-time interval division module, configured to acquire an action interval of the energy storage system, where the state of the energy storage system includes a state of a substation, a state of a train, and a state of an energy storage apparatus in the action interval.

In an embodiment, the real-time interval division module includes a selection module and a determination module.

The selection module is configured to select a central substation.

The determination module is configured to: determine whether impact of the train at different positions on a terminal voltage of the central substation is greater than a threshold voltage; and when the impact is greater than the threshold voltage, determine that the action interval includes the central substation and a substation where the train is located.

In an embodiment, the robustness enhancement module includes a pre-training module and a ratio output module.

The pre-training module is configured to acquire a correspondence between any communication delay amount and delay degree and the fusion ratio through pre-training.

The ratio output module is configured to: based on the correspondence, acquire the fusion ratio of the offline charging-discharging action to the online charging-discharging action according to the communication delay amount and the delay degree.

In an embodiment, the pre-training module includes an initialization module, a first action acquisition module, a second action acquisition module, an execution module, an update module, and a repetition module.

The initialization module is configured to initialize the fusion ratio.

The first action acquisition module is configured to: under any communication delay amount and delay degree, acquire the online charging-discharging action according to the state of the energy storage system.

The second action acquisition module is configured to: acquire the offline charging-discharging action according to the state of the energy storage system; and calculate a fused charging-discharging action based on the online charging-discharging action, the offline charging-discharging action and the fusion ratio.

The execution module is configured to perform the offline charging-discharging action and the fused charging-discharging action separately, to obtain a first reward signal that is based on the fused charging-discharging action and a second reward signal that is based on the offline charging-discharging action.

The update module is configured to update the fusion ratio based on the first reward signal and the second reward signal, where when the first reward signal is greater than the second reward signal, the fusion ratio is increased, and when the first reward signal is less than the second reward signal, the fusion ratio is reduced.

The repetition module is configured to repeat the step of updating the fusion ratio until a change ratio of the fusion ratio reaches a termination value.

Figure 16:
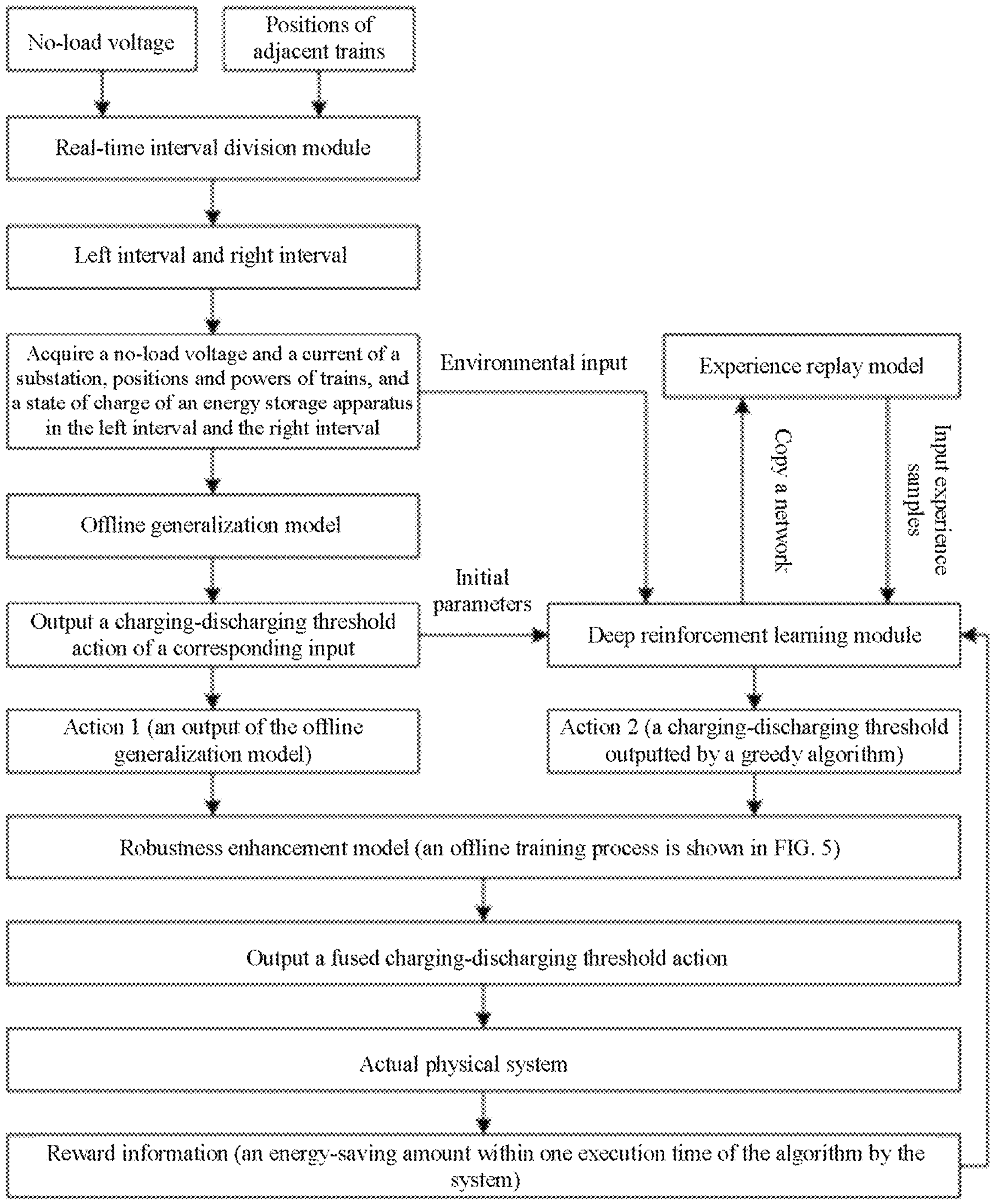
FIG. 16 is a working flowchart of a model for controlling an energy storage system for rail transit according to an embodiment of the present application.

In an embodiment, a working flowchart of a model for controlling an energy storage system for rail transit according to an embodiment of the present application is shown in FIG. 16, and includes the following steps.

Step 1: Invoke a real-time interval division model, and determine a scale of training that needs to be performed.

Step 2: Invoke an offline generalization model, and use an output of the offline generalization model as an initial grid of a deep reinforcement learning model.

Step 3: Repeatedly and iteratively update model parameters of a neural network by using a state s (a no-load voltage and an output current of a substation, positions and powers of trains, and a state of charge of an energy storage apparatus in an action interval determined by the real-time interval division model) as an input, a greedy algorithm as an action selection strategy, a reward generated from an action as a feedback, and a gradient descent method as a parameter update algorithm, to train a deep neural network model.

Step 4: Simultaneously store trained complete data and network parameters in an experience replay module once every certain time, and randomly perform sampling from the experience replay module during training, to break relevance between consecutive training data.

Step 5: The offline generalization module determines an offline charging-discharging action (an action 1) based on the state of the energy storage system, and the deep reinforcement learning module determines an online charging-discharging action (an action 2) according to the state of the energy storage system.

Step 6: Invoke the robustness enhancement module to obtain an appropriate fusion ratio k based on a delay state of data transmitted at a current moment, where an action 1 outputted by the deep reinforcement learning module and an action 2 outputted by the offline generalization model are fused using the value of k to output an eventual charging-discharging threshold action, and the value of k continues to be updated based on small amplitudes in real time.

Step 7: An actual physical system runs according to the outputted eventual charging-discharging threshold action, calculates reward information, and feeds back the reward information to the deep reinforcement learning module for learning.

For the model for controlling an energy storage system for rail transit in the embodiment of the present application, on the basis of a DQN reinforcement learning algorithm, the offline generalization model, the real-time interval division module, the experience replay module, the robustness enhancement module, and the like are combined to implement online real-time globally optimal control of the energy storage system for the first time. In view of the problem that an existing global optimization algorithm cannot run on line in real-time, the concept of behavior cloning is introduced, the offline generalization model is used as an initial input for reinforcement learning, so that the generalization capability of the algorithm is improved. To avoid the problem that processing of information using an algorithm is excessively complex, the concept of real-time interval-based control is introduced, and the real-time interval division module is proposed, so that a convergence capability and an operation speed of the algorithm are improved. An appropriately designed neural network and an action-value function are fit, and techniques such as "experience replay" and "independent target network" are used in the algorithm, thereby improving a convergence speed of the algorithm. In consideration of problems such as a communication delay, the robustness enhancement module is proposed for the first time, thereby improving the robustness of the reinforcement learning algorithm.

Figure 17:
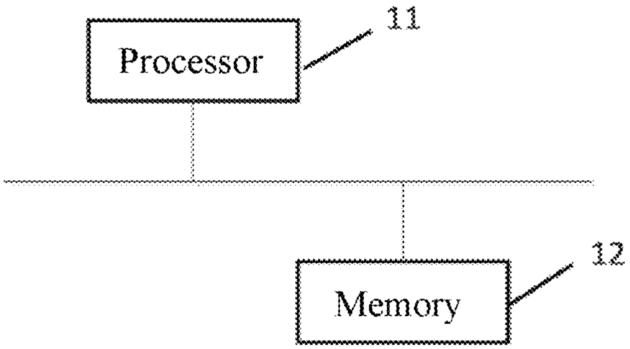
FIG. 17 is a schematic structural diagram of an electronic device according to an embodiment of the present application.

An embodiment of the present application further provides an electronic device, and as shown in FIG. 17, includes a memory 12 and a processor 11. The memory 12 and the processor 11 are in communication connection with each other. The memory 12 stores computer instructions. The processor 11 is configured to execute the computer instructions to perform the method for controlling an energy storage system for rail transit in the foregoing method embodiments. The processor 11 and the memory 12 may be connected by a bus or in another manner. The processor 11 may be a central processing unit (CPU). The processor 11 may be another general-purpose processor, digital signal processor (DSP), application-specific integrated circuit (ASIC), field-programmable gate array (FPGA) or another programmable logic device, discrete gate or transistor logic device, a discrete hardware component, among other chips, or a combination of the foregoing various types of chips. The memory 12 is used as a non-transient computer storage medium, and may be configured to store non-transient software programs, non-transient computer-executable programs, and modules, for example, program instructions/modules corresponding to the embodiments of the present application. The processor 11 runs the non-transient software programs, instructions, and modules stored in the memory 12 to perform various functional applications and data processing of the processor 11, that is, implement the method for controlling an energy storage system for rail transit in the foregoing method embodiments. The memory 12 may include a program storage area and a data storage area. The program storage area may store an operating apparatus and an application required for at least one function. The data storage area may store data created by the processor 11. Moreover, the memory 12 may include a high-speed random access memory (RAM) 12, and may further include a non-transient storage 12, for example, at least one magnetic disk storage device 12, a flash storage device, or other non-transient solid state storage device 12. In some embodiments, the memory 12 includes memories 12 disposed remotely with respect to the processor 11. These remote memories 12 may be connected to the processor 11 by a network. An example of the foregoing network includes, but not limited to, the internet, an intranet, a local area network, a mobile communication network, and a combination thereof. One or more modules are stored in the memory 12, and perform, when being executed by the processor 11, the method for controlling an energy storage system for rail transit in the foregoing method embodiments. For specific details of the foregoing electronic device, reference may be correspondingly made to related description and effects corresponding to the foregoing method embodiments for understanding. Details are not described herein again.

Figure 18:
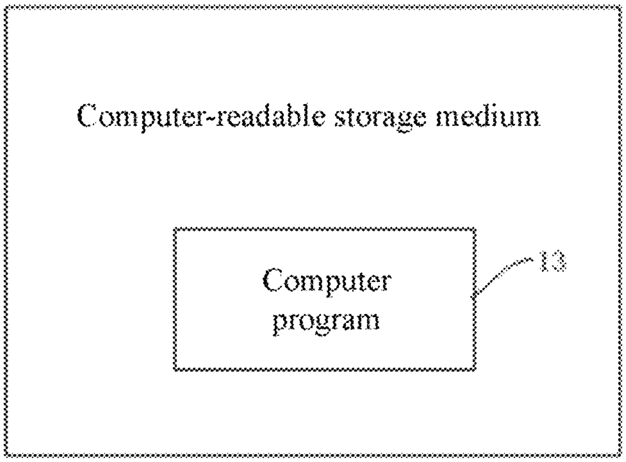
FIG. 18 is a schematic structural diagram of a storage medium according to an embodiment of the present application.

An embodiment of the present application further provides a computer-readable storage medium. As shown in FIG. 18, the computer-readable storage medium stores a computer program 13. The instructions are executed by a processor to implement the steps of the method for controlling an energy storage system for rail transit in the foregoing embodiments. The storage medium further stores audio and video streaming data, feature frame data, interaction request signaling, encryption data, and a preset data size. The storage medium may be a magnetic disk, an optical disc, a read-only memory (ROM), a random access memory (RAM), a flash memory, a hard disk drive (HDD) or a solid-state drive (SSD) or the like. The storage medium may include a combination of the memories of the foregoing types. A person skilled in the art may understand that all or a part of the procedures in the methods of the embodiments may be implemented by a computer program instructing relevant hardware. The computer program 13 may be stored in a computer-readable storage medium. The program is executed to perform the procedures in the foregoing embodiments of the methods. The storage medium may be a magnetic disk, an optical disc, a read-only memory (ROM), a random access memory (RAM), a flash memory, a hard disk drive (HDD) or a solid-state drive (SSD) or the like.

The storage medium may include a combination of the memories of the foregoing types.

The foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments or make equivalent replacements to some the technical features thereof, without departing from the scope of the technical solutions of the embodiments of the present application.

What is claimed is:

1. A method for controlling an energy storage system for rail transit, comprising:

constructing an offline generalization model based on an offline algorithm, and determining an offline charging-discharging action according to a state of an energy storage system based on an offline algorithm, wherein an input of the offline generalization model comprises powers and positions of adjacent trains and a state of charge (SOC) of the energy storage system, and an output of the offline generalization model is the offline charging-discharging action of the energy storage system, which is an offline charging-discharging threshold;

determining an online charging-discharging action according to the state of the energy storage system based on a deep reinforcement learning algorithm, wherein the online charging-discharging action is a value outputted through operation using the deep reinforcement learning algorithm, and after acquiring the state of the energy storage system, the online charging-discharging action is obtained through analysis according to the deep reinforcement learning algorithm, which is an online learning-based charging-discharging threshold;

acquiring a fusion ratio of the offline charging-discharging action to the online charging-discharging action according to a communication delay amount and a delay degree; wherein the communication delay comprises a transmission delay and a program processing delay; and fusing the offline charging-discharging threshold and the online learning-based charging-discharging threshold according to the fusion ratio by weighted fusion, to obtain a fused charging-discharging threshold, and outputting the fused charging-discharging threshold to the energy storage system;

wherein the fused charging-discharging threshold is calculated by a formula:

$$a2 = a * k + a1 * (1 - k)$$

wherein, a is the online charging-discharging threshold, a1 is the offline charging-discharging threshold, k is an initialized fusion ratio, and a2 is the fused charging-discharging threshold.

2. The method for controlling an energy storage system for rail transit according to claim 1, wherein the step of determining an online charging-discharging action according to the state of the energy storage system based on a deep reinforcement learning algorithm comprises:

receiving the state of the energy storage system and the offline charging-discharging action;

assigning a maximum value to an action-value function corresponding to the offline charging-discharging action, using the offline charging-discharging action as an initial value of a neural network and training the neural network using training data, wherein the neural network outputs an action-value function according to the state of the energy storage system; and an action of the action-value function is a charging-discharging threshold; and acquiring the online charging-discharging action based on the action-value function and a greedy strategy, wherein the greedy strategy is selecting an action of a maximum action-value function in a current state with a certain probability.

3. The method for controlling an energy storage system for rail transit according to claim 2, wherein the step of determining an online charging-discharging action according to the state of the energy storage system based on a deep reinforcement learning algorithm further comprises:

storing used training data, and randomly extracting training data from the used training data to train the neural network again.

4. The method for controlling an energy storage system for rail transit according to claim 1, wherein before the step of constructing an offline generalization model based on an offline algorithm, and determining an offline charging-discharging action according to a state of an energy storage system based on an offline algorithm, the method further comprises:

acquiring an action interval of the energy storage system, wherein the action interval is an energy control region divided according to an electrical coupling strength of impact of train operation on a substation terminal voltage; and wherein the state of the energy storage system comprises a state of a substation, a state of a train, and a state of an energy storage apparatus in the action interval.

5. The method for controlling an energy storage system for rail transit according to claim 4, wherein the step of acquiring an action interval of the energy storage system comprises:

selecting a central substation;

determining whether impact of the train at different positions on a terminal voltage of the central substation is greater than a threshold voltage; and when the impact is greater than the threshold voltage, determining that a strong coupling exists between a position of the train and the central substation, and comprising both the central substation and a substation where the train is located in the action interval, wherein the action interval comprises the central substation and a substation where the train is located;

wherein determining whether impact of the train at different positions on a terminal voltage of the central substation is greater than a threshold voltage comprises:

determining whether an absolute deviation |Umid−Uoc| of the terminal voltage of the central substation when the train runs at a maximum running power is greater than a threshold voltage Ulim;

wherein Uoc is an output terminal voltage of the central substation when no train is running, and Umid is an output terminal voltage of the central substation when the train outputs a maximum running power at different positions.

6. The method for controlling an energy storage system for rail transit according to claim 1, wherein the step of acquiring a fusion ratio of the offline charging-discharging action to the online charging-discharging action according to a communication delay amount and a delay degree comprises:

acquiring a correspondence between any communication delay amount and delay degree and the fusion ratio through pre-training; and based on the correspondence, acquiring the fusion ratio of the offline charging-discharging action to the online charging-discharging action according to the communication delay amount and the delay degree.

7. The method for controlling an energy storage system for rail transit according to claim 6, wherein the step of acquiring a correspondence between any communication delay amount and delay degree and the fusion ratio through pre-training, a method for determining the fusion ratio, comprises:

initializing the fusion ratio;

under any communication delay amount and delay degree, acquiring the online charging-discharging action according to the state of the energy storage system;

acquiring the offline charging-discharging action according to the state of the energy storage system;

calculating a fused charging-discharging action based on the online charging-discharging action, the offline charging-discharging action and the fusion ratio;

performing the offline charging-discharging action and the fused charging-discharging action separately, to obtain a first reward signal based on the fused charging-discharging action and a second reward signal based on the offline charging-discharging action;

obtaining a fusion ratio at a time t based on the first reward signal and the second reward signal, wherein when the first reward signal is greater than the second reward signal, the fusion ratio is increased, and when the first reward signal is less than the second reward signal, the fusion ratio is reduced; and calculating a change ratio of the fusion ratio by comparing the fusion ratio at the time t with a fusion ratio obtained at a time t−1;

if the change ratio of the fusion ratio is greater than a termination value, repeating the steps of increasing or reducing the fusion ratio; and if the change ratio of the fusion ratio is less than the termination value, exiting a loop and determining the fusion ratio at the time t corresponding to the change ratio as the determined fusion ratio.

8. An electronic device, comprising: a memory and a processor, wherein the memory and the processor are in communication connection with each other, the memory stores computer instructions, and the processor is configured to execute the computer instructions to perform the method for controlling an energy storage system for rail transit according to claim 1.

9. A non-transitory computer-readable storage medium, wherein the computer-readable storage medium stores computer instructions, and the computer instructions are used for enabling a computer to perform the method for controlling an energy storage system for rail transit according to claim 1.

* * * * *